United States Patent
Yang et al.

(10) Patent No.: US 11,488,320 B2
(45) Date of Patent: Nov. 1, 2022

(54) POSE ESTIMATION METHOD, POSE ESTIMATION APPARATUS, AND TRAINING METHOD FOR POSE ESTIMATION

(71) Applicant: Samsung Electronics Co., Ltd., Suwon-si (KR)

(72) Inventors: Huiguang Yang, Xi'an (CN); Jiguang Xue, Xi'an (CN); Zhuo Li, Xi'an (CN); Chuangqi Tang, Xi'an (CN); Xiongzhan Linghu, Xi'an (CN); Yuguang Li, Xi'an (CN); Liu Yang, Xi'an (CN); Jian Zhao, Xi'an (CN); Manjun Yan, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 16/943,048

(22) Filed: Jul. 30, 2020

(65) Prior Publication Data
US 2021/0035325 A1  Feb. 4, 2021

(30) Foreign Application Priority Data

Jul. 31, 2019 (CN) .......................... 201910698047.2
Jul. 30, 2020 (KR) ........................ 10-2020-0095127

(51) Int. Cl.
*G06T 7/73* (2017.01)

(52) U.S. Cl.
CPC ...... *G06T 7/73* (2017.01); *G06T 2207/10016* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 10,304,208 B1 | 5/2019 | Chandler et al. | |
| 10,540,812 B1 * | 1/2020 | Yildiz | G06T 15/50 |

(Continued)

FOREIGN PATENT DOCUMENTS

| | | |
|---|---|---|
| JP | 2003-35515 A | 2/2003 |
| JP | 2003-106813 A | 4/2003 |

(Continued)

OTHER PUBLICATIONS

Selected LED flicker detection and mitigation algorithm for non-HDR video sequences, by Behmann et al., 2018 IEEE 8th international conference on consumer electronics—Berlin (Year: 2018).*

(Continued)

*Primary Examiner* — Vikkram Bali
(74) *Attorney, Agent, or Firm* — NSIP Law

(57) ABSTRACT

A pose estimation method includes obtains an event stream from an event-based vision sensor configured to capture a target object to which light-emitting devices flickering at a predetermined first frequency are attached, obtains a polarity change period of at least one pixel based on the event stream, generates an image frame sequence using at least one target pixel having a polarity change period corresponding to the first frequency, among the at least one pixel, extracts a feature sequence including feature vectors corresponding to the at least one target pixel, from the image frame sequence, and estimates a pose sequence of the target object by applying the feature sequence to a deep neural network (DNN) model.

20 Claims, 8 Drawing Sheets

(56) References Cited

U.S. PATENT DOCUMENTS

| | | | |
|---|---|---|---|
| 2018/0182124 A1 | 6/2018 | Savkin | |
| 2018/0329484 A1 | 11/2018 | Steedly et al. | |
| 2018/0330521 A1* | 11/2018 | Samples | A63F 13/428 |
| 2018/0357789 A1 | 12/2018 | Yang et al. | |
| 2019/0107894 A1 | 4/2019 | Hebbalaguppe et al. | |
| 2019/0180469 A1 | 6/2019 | Gu et al. | |
| 2020/0389582 A1* | 12/2020 | Herman | H04N 5/23218 |

FOREIGN PATENT DOCUMENTS

| | | |
|---|---|---|
| JP | 2019-91102 A | 6/2019 |
| WO | WO 2018/162929 A1 | 9/2018 |
| WO | WO 2019/113067 A2 | 6/2019 |

OTHER PUBLICATIONS

A monocular pose estimation system based on infrared LEDs, by Faessler et al., 2014 IEEE International conference on Robotics and Automation, Hong Kong, China (Year: 2017).*

* cited by examiner

POSE ESTIMATION METHOD, POSE ESTIMATION APPARATUS, AND TRAINING METHOD FOR POSE ESTIMATION

CROSS-REFERENCE TO RELATED APPLICATIONS

This application claims the benefit under 35 USC 119(a) of Chinese Patent Application No. 201910698047.2 filed on Jul. 31, 2019, in the Chinese Patent Office, and Korean Patent Application No. 10-2020-0095127 filed on Jul. 30, 2020, in the Korean Intellectual Property Office, the entire disclosures of which are incorporated herein by reference for all purposes.

BACKGROUND

1. Field

The following description relates to a pose estimation method, a pose estimation apparatus, and a training method for pose estimation.

2. Description of Related Art

Three-dimensional (3D) object tracking and six-degree of freedom (6-DoF) pose estimation is significant in artificial intelligence and robot technology. For example, a pose of an object that moves in a 3D space, including a position and an angle, may be estimated in view of a continuous trajectory of the object tracked through visual observation. Reconstructing a 6-DoF pose from a visual signal requires a complex process and an accurate understanding of a 3D object model and camera calibration parameters. Inaccuracies at all steps, including noise occurring at each step of the process described above, and inaccuracies in the 3D object model and camera parameters, may cause significant errors in estimating a final pose of the object. In addition, it is impossible to track an object or estimate a pose if the amount of information obtained from an image is not sufficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a pose estimation method includes obtaining an event stream from an event-based vision sensor configured to capture a target object to which light-emitting devices flickering at a predetermined first frequency are attached, obtaining a polarity change period of at least one pixel based on the event stream, generating an image frame sequence using at least one target pixel having a polarity change period corresponding to the first frequency, among the at least one pixel, extracting a feature sequence including feature vectors corresponding to the at least one target pixel, from the image frame sequence, and estimating a pose sequence of the target object by applying the feature sequence to a deep neural network (DNN) model.

The event stream may include any one or any combination of a timestamp indicating a time at which an event corresponding to the flickering is sensed, position coordinates of at least one pixel corresponding to the event, and a polarity corresponding to the event.

The event stream may include at least one of a first event that occurs in synchronization with the first frequency, and a second event that occurs without synchronization with the first frequency.

The generating may include determining a pixel at a position to be the at least one target pixel, based on whether the polarity change period obtained from the pixel at the position, among the at least one pixel, has a periodicity in relation to the first frequency.

The determining may include determining a pixel at a position to be the at least one target pixel, based on whether a difference between the first frequency and a second frequency corresponding to the polarity change period at the pixel of the position, among the at least one pixel, is within a preset threshold range.

The determining may include determining a pixel at a position to be the at least one target pixel, based on a deviation between lengths of polarity change periods consecutively sensed from the pixel at the position, among the at least one pixel.

The determining may include determining a pixel at a position to be the at least one target pixel, in response to the deviation being less than a threshold, and determining the pixel at the position to be a background pixel, in response to the deviation being greater than or equal to the threshold.

The generating may include generating the image frame sequence by synthesizing an image frame including the at least one target pixel.

The extracting may include decomposing an image matrix corresponding to each of image frames in the image frame sequence into a first orthogonal matrix, a second orthogonal matrix, and a diagonal matrix through singular value decomposition (SVD), generating the feature vectors corresponding to each of the image frames, based on at least a portion of column vectors of the first orthogonal matrix, at least a portion of column vectors of the second orthogonal matrix, and at least a portion of singular values of the diagonal matrix, and forming the feature sequence based on the feature vectors.

At least a portion of the singular values of the diagonal matrix may include sequential N singular values in descending order of the singular values of the diagonal matrix (N being a natural number), at least a portion of the column vectors of the first orthogonal matrix may include N column vectors of the first orthogonal matrix corresponding to the N singular values, and at least a portion of the column vectors of the second orthogonal matrix may include N column vectors of the second orthogonal matrix corresponding to the N singular values.

The DNN model may include a regression layer, and the regression layer may be configured to estimate 6 degrees of freedom (6-DoF) of the target object corresponding to the pose sequence estimated based on the feature sequence.

In another general aspect, a pose estimation apparatus includes a sensor configured to capture an event stream of a target object to which light-emitting devices flickering at a predetermined first frequency are attached, and a processor configured to obtain a polarity change period of at least one pixel based on the event stream, generate an image frame sequence using at least one target pixel having a polarity change period corresponding to the first frequency, among the at least one pixel, extract a feature sequence including feature vectors corresponding to the at least one target pixel, from the image frame sequence, and estimate a pose sequence of the target object by applying the feature sequence to a DNN model.

The event stream may include at least one of a timestamp indicating a time at which an event corresponding to the flickering is sensed, position coordinates of at least one pixel corresponding to the event, and a polarity corresponding to the event.

The processor may be configured to determine a pixel at a position to be the at least one target pixel, based on whether the polarity change period obtained from the pixel at the position, among the at least one pixel, has a periodicity in relation to the first frequency.

The processor may be configured to determine a pixel at a position to be the at least one target pixel, based on whether a difference between the first frequency and a second frequency corresponding to the polarity change period at the pixel of the position, among the at least one pixel, is within a preset threshold range.

The processor may be configured to determine a pixel at a position to be the at least one target pixel, based on a deviation between lengths of polarity change periods consecutively sensed from the pixel at the position, among the at least one pixel.

The processor may be configured to decompose an image matrix corresponding to each of image frames in the image frame sequence into a first orthogonal matrix, a second orthogonal matrix, and a diagonal matrix through SVD, generate the feature vectors corresponding to each of the image frames, based on at least a portion of column vectors of the first orthogonal matrix, at least a portion of column vectors of the second orthogonal matrix, and at least a portion of singular values of the diagonal matrix, and form the feature sequence based on the feature vectors.

At least a portion of the singular values of the diagonal matrix may include sequential N singular values in descending order of the singular values of the diagonal matrix (N being a natural number), at least a portion of the column vectors of the first orthogonal matrix may include N column vectors of the first orthogonal matrix corresponding to the N singular values, and at least a portion of the column vectors of the second orthogonal matrix may include N column vectors of the second orthogonal matrix corresponding to the N singular values.

The pose estimation apparatus may include any one or any combination of a head-up display (HUD) device, a three-dimensional digital information display (3D DID), a 3D mobile device, a virtual reality handle controller, and a smart vehicle.

Other features and aspects will be apparent from the following detailed description, the drawings, and the claims.

Figure 1:
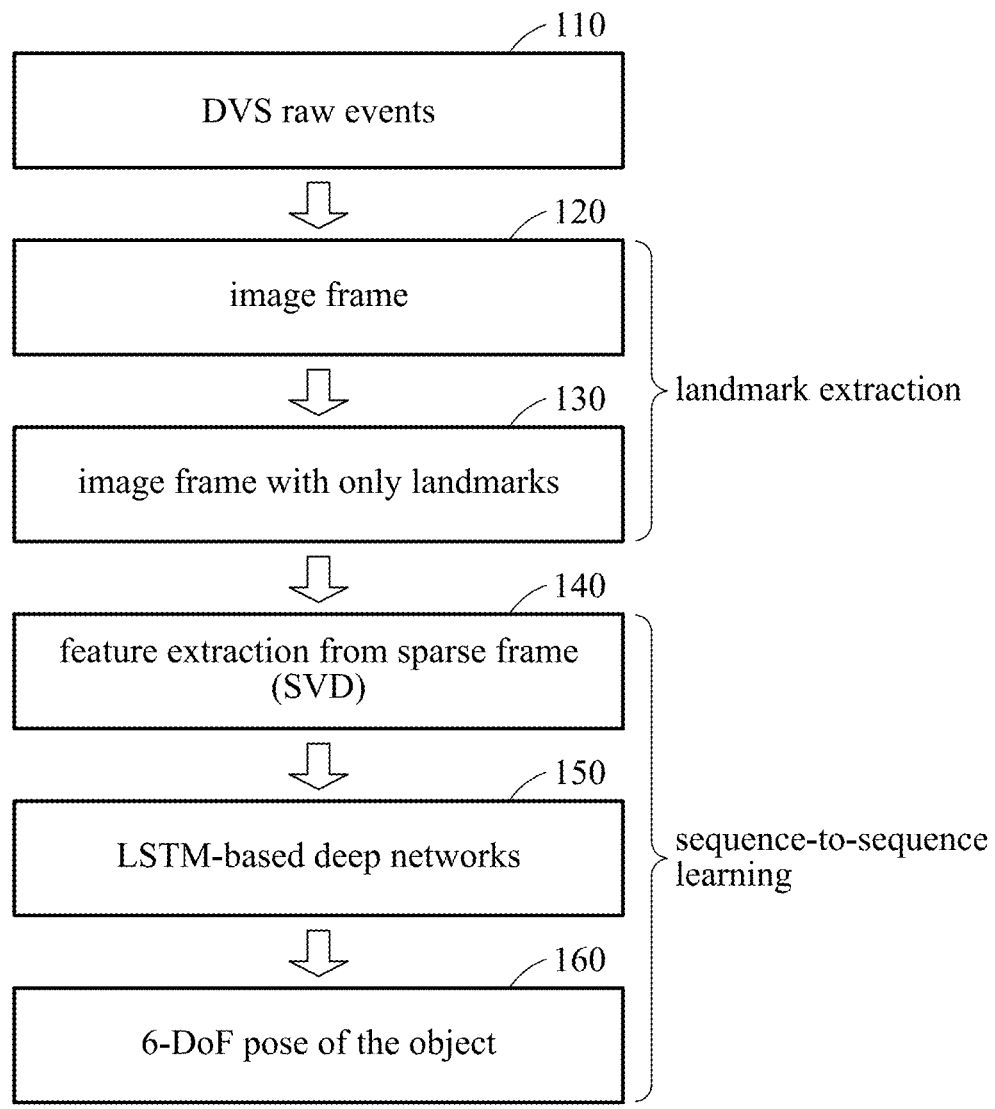
FIG. 1 illustrates an example of estimating a pose based on deep learning.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

In addition, the terms first, second, A, B, (a), and (b) may be used to describe constituent elements of the examples. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The constituent element, which has the same common function as the constituent element included in any one example, will be described by using the same name in other examples. Unless disclosed to the contrary, the configuration disclosed in any one example may be applied to other examples, and the specific description of the repeated configuration will be omitted.

FIG. 1 illustrates an example of estimating a pose based on deep learning. Referring to FIG. 1, a process of estimating a pose of a target object from a sparse image having a very small amount of information through operations 110 to 160 in a pose estimation apparatus is illustrated.

In an example, a pose of a target object is captured using an event-based vision sensor or dynamic vision sensor (DVS) camera, in case of using an autostereoscopic three-dimensional (3D) monitor, an autostereoscopic 3D tablet/smart phone, or a 3D head-up display (HUD) for vehicles. In addition, the examples to capture the pose of a target object may be implemented by hardware components. Examples of hardware components that may be used to perform the operations described in this application where appropriate include various devices, such as, for example, on a chip in a monitor, an app running on a processor in a tablet/smart phone, or another hardware pose estimation apparatus. The examples may be applicable to, for example, a HUD device, a 3D digital information display (DID), a 3D mobile device, a handle controller, and a smart vehicle.

For example, it may be assumed that a user captures a movement of a target object (for example, a handle controller) using a DVS camera. In this example, the movement of the target object may be used to control a movement of a virtual controller corresponding to the target object in a virtual reality environment. If the pose estimation apparatus estimates a pose of the target object, the estimated pose may be reflected in an operation of the virtual controller.

Hereinafter, for ease of description, an example of using a DVS camera will be described. However, examples are not limited thereto, and a type of capturing device other than the DVS camera may be used. The pose estimation apparatus may use any capturing device capable of obtaining an event stream or a capturing device capable of acquiring an image frame sequence.

In operation 110, the pose estimation apparatus obtains an event stream including raw events corresponding to a target object from a video frame captured by the event-based vision sensor or DVS camera.

In an example, the DVS camera only senses light-emitting devices having a predetermined flicker frequency and does not sense a background other than the light-emitting devices. Therefore, light-emitting devices having a predetermined flicker frequency may be disposed on the surface of the target object. The video frame captured by the DVS camera may include only a small amount (or a very small amount) of information on events corresponding to the light-emitting devices. Symbols indicating the light-emitting devices may be displayed on the video frame. The symbols indicating the light-emitting devices may be, for example, ° or *, and are not necessarily limited thereto. The video frame may be used as an input of the pose estimation apparatus for estimating a six-degree of freedom (6-DoF) pose of the target object.

The "target object" may refer to an object of which a 6-DoF pose is to be estimated by the pose estimation apparatus. The target object may include, for example, a person, a pedestrian, a vehicle, a building, a handle controller, a stick, and the like, but is not limited thereto. As described above, light-emitting devices flickering at a predetermined first frequency may be attached to the target object, and the pose estimation apparatus may obtain an event stream based on the first frequency at which the light-emitting devices flicker. The light-emitting devices may be, for example, light-emitting diodes (LEDs). The light-emitting devices may be attached to, for example, positions that represent the shape of the target object and the characteristics of the target object. The light-emitting devices may correspond to "landmarks" of the target object. The "event stream" may refer to a continuous stream of raw events sensed by the DVS over time. For example, the event stream may be obtained by encoding a timestamp t corresponding to a time at which a raw event is sensed by the DVS camera, position coordinates (x, y) of a pixel corresponding to the event, and a polarity p of the event.

In operation 120, the pose estimation apparatus may generate image frame(s) based on the event stream obtained in operation 110. In the event stream obtained in operation 110, the target object and background information around the target object are not discriminated. In operation 120, the pose estimation apparatus may discriminate first events ("flicker events") that are related to the first frequency at which the light-emitting devices attached to the target object flicker, from second events ("random noise events") that occur due to noise components and are unrelated to the first frequency. The first events may occur in synchronization with the first frequency, and the second events may occur at random without synchronization with the first frequency. An example in which the pose estimation apparatus discriminates flicker events from random noise events will be described further below. Operation 120 of generating the image frame from the event stream may correspond to a "pre-processing" process.

In operation 130, the pose estimation apparatus may generate an image frame including only the flicker events corresponding to the light-emitting devices. The pose estimation apparatus may generate, for example, an image frame or an image frame sequence including only the flicker events corresponding to the light-emitting devices using polarity values of events included in the event stream. The "image frame sequence" may refer to image frames arranged in the form of a sequence.

The image frame generated in operation 130 is generated based on events corresponding to the light-emitting devices and may correspond to, for example, a "sparse image frame" having little edge information or texture information. Operations 120 and 130 may also be referred to as a "landmark extraction" process.

In operation 140, the pose estimation apparatus may extract a feature sequence including features from the image frame or image frame sequence generated in operation 130. The pose estimation apparatus may extract the features, for example, by decomposing an image matrix corresponding to the image frame or each image frame of the image frame sequence through singular value decomposition (SVD). The features may be in the form of a feature vector or a feature map, but are not necessarily limited thereto. Here, the "feature sequence" may refer to feature vectors arranged in the form of a sequence.

SVD may be construed as generalizing the spectral theory of a matrix with respect to an arbitrary rectangular matrix. Using the spectral theory, an orthogonal square matrix may be decomposed into diagonal matrices based on eigenvalues.

For example, it may be assumed that there are vectors $Mv=\sigma u$, $M*u=\sigma v$. and $u\in K^m$ that satisfy conditions $V^{=Kn}$ with respect to a matrix M having a size of m×n. In this case, a non-negative real number $\sigma$ may be referred to as a "singular value", and u and v may be referred to as a "left singular vector" and a "right singular vector", respectively. In addition, in SVD $M=U\Sigma V*$, the diagonal components of $\Sigma$ may become singular values of M, and the columns of U and V may be left singular vectors and right singular vectors corresponding to the respective singular values.

Since the image frame or image frame sequence generated in operation 130 includes a very small amount of information, it is impossible to extract features therefrom using a traditional convolutional neural network (CNN). Accordingly, the features or feature sequence may be extracted through a compression technique such as SVD for the image frame or image frame sequence. SVD will be described further in detail below.

In operation 150, the pose estimation apparatus may estimate a pose sequence of the target object by applying the feature sequence including the features extracted in operation 140 to a deep neural network (DNN). The DNN may be, for example, a long short-term memory (LSTM) based DNN or a recurrent neural network (RNN). The structure of the DNN will be described in detail with reference to FIG. 8.

In operation 160, the pose estimation apparatus may estimate a 6-DoF pose of the target object based on the pose sequence of the target object. The pose estimation apparatus may estimate the 6-DoF pose of the target object by tracking a trajectory of the target object based on the pose sequence of the target object.

Operations 140 to 160 may be referred to as a "sequence-to-sequence learning" process. Here, the "sequence-to-sequence" may be construed as a model used to output a sequence of another domain from an input sequence in various fields such as, for example, chatbot, machine translation, text summarization, and speech to text (STT).

The pose estimation apparatus may receive a distribution pattern of the light-emitting devices obtained by the DVS camera, instead of the event stream obtained by the DVS camera, and estimate the 6-DoF pose of the target object in a predetermined coordinate system. In addition, the pose estimation apparatus may use deep learning based on time series learning to reflect the relevance of time and context information between frames.

Figure 2:
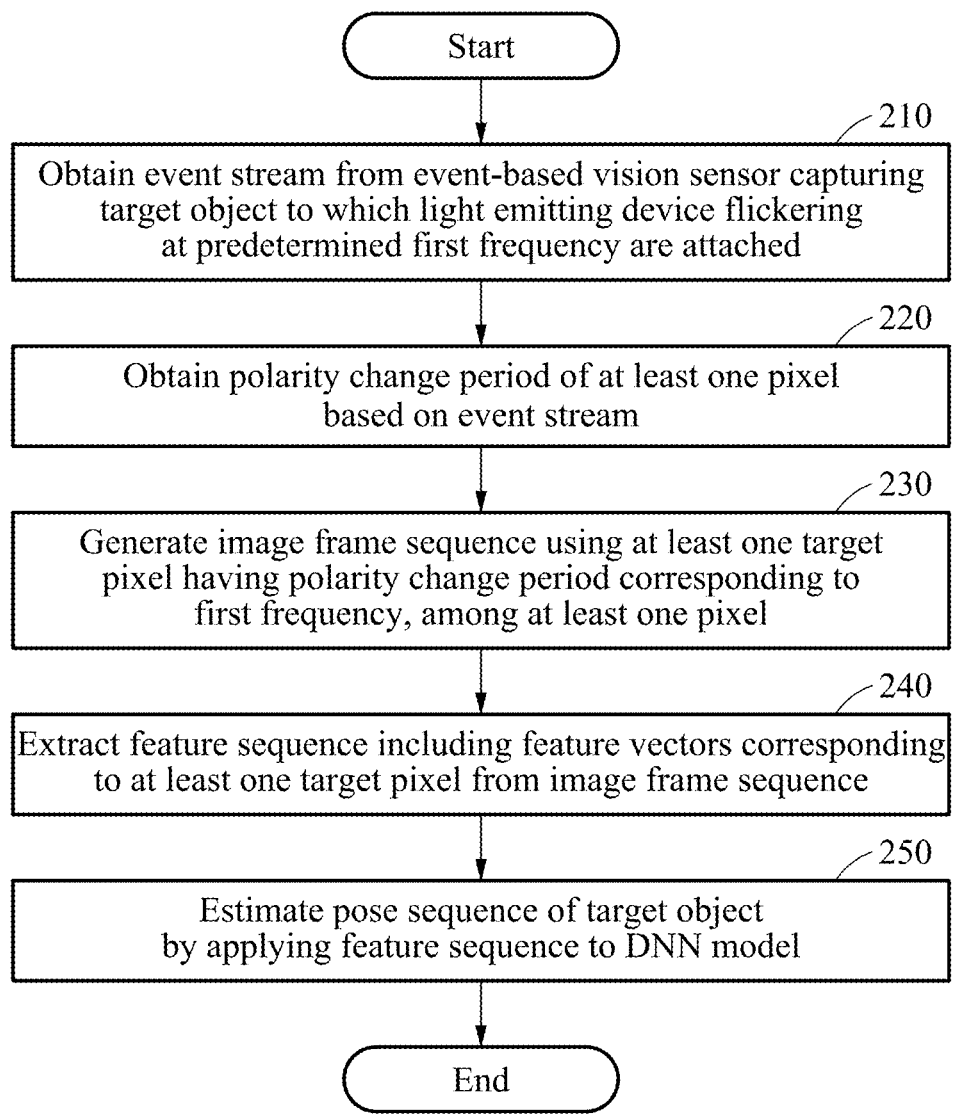
FIG. 2 illustrates an example of a pose estimation method.

FIG. 2 illustrates an example of a pose estimation method. Referring to FIG. 2, a pose estimation apparatus may estimate a pose sequence of a target object to which light-emitting devices are attached, by performing operations 210 to 250.

In operation 210, the pose estimation apparatus obtains an event stream from an event-based vision sensor capturing a target object to which light-emitting devices flickering at a predetermined first frequency are attached. In this example, as brightly shown in an image 310 of FIG. 3, the light-emitting devices may be attached to the target object, such that the pose estimation apparatus may obtain an event stream.

The event stream may include, for example, any one or any combination of a timestamp t indicating a time at which an event corresponding to flickering is sensed, position coordinates (x, y) of at least one pixel corresponding to the flickering event, and a polarity p corresponding to the event. In this example, the polarity p corresponding to the event may be a polarity of at least one pixel corresponding to the event. The polarity p may correspond to, for example, a change in the illumination intensity of a light-emitting device including enhancement ("On" or "1") and weakening ("Off" or "0"). The event stream may include events in the form of a continuous stream over time. Each of the events included in the event stream may also include a timestamp, position coordinates, and a polarity.

For example, the pose estimation apparatus may represent "1" as a pixel value of a pixel in which an event related to a light-emitting device flickering at the first frequency occurs in an image frame, thereby discriminating the pixel from a pixel corresponding to a background or noise.

In operation 220, the pose estimation apparatus obtains a polarity change period of at least one pixel based on the event stream obtained in operation 210. The polarity change period will be described in detail below with reference to FIG. 4.

In operation 230, the pose estimation apparatus generates an image frame sequence using at least one target pixel having a polarity change period corresponding to the first frequency, among the at least one pixel. In an example, an image frame sequence is generated from an event stream to perform deep learning based on computer vision. In an example, the image frame sequence may include sequential image frames acquired for a predetermined period of time. An image frame 330 of FIG. 3 may be an example of an image frame generated from the event stream.

In operation 230, the pose estimation apparatus may determine a pixel at a position to be the at least one target pixel, for example, based on whether the polarity change period obtained from the pixel at the position, among the at least one pixel, has a periodicity in relation to the first frequency. The "target pixel" may refer to a pixel corresponding to a light-emitting device having a predetermined flicker frequency in an image frame.

The pose estimation apparatus may determine a pixel at a position to be the at least one target pixel, based on whether a difference between the first frequency and a second frequency corresponding to the polarity change period at the pixel of the position, among the at least one pixel, is within a preset threshold range. Here, the "second frequency corresponding to the polarity change period" may be calculated by 1/polarity change period.

Alternatively, the pose estimation apparatus may determine a pixel at a position to be the at least one target pixel, based on a deviation between lengths of polarity change periods consecutively sensed from the pixel at the position, among the at least one pixel. The pose estimation apparatus may determine a pixel at a position to be the at least one target pixel, in response to the deviation between the lengths of the polarity change periods being less than a threshold. The pose estimation apparatus may determine the pixel at the position to be a background pixel, in response to the deviation between the lengths of the polarity change periods being greater than or equal to the threshold.

In operation 230, the pose estimation apparatus may generate the image frame sequence by synthesizing an image frame including the at least one target pixel.

For example, if the first frequency reaches a predetermined level (for example, 1 kHz or higher), the DVS camera may not be disturbed by low frequency noise and motion blur when sensing the light-emitting devices. In this example, the pose estimation apparatus may regard the remaining portion, except for the regions corresponding to the light-emitting devices in the image frame, as a background region. The pose estimation apparatus may sense only the regions corresponding to the light-emitting devices, for example, by removing the background region set in black from the image frame. The pose estimation apparatus may use the regions in which events by the light-emitting devices are sensed, as an ideal input for pose estimation.

For example, when event(s) output for a predetermined period of time are obtained by the DVS camera, the pose estimation apparatus may acquire a binary image in which the events are depicted in the form of pixels in the same image frame, according to coordinates (x, y) included in the events. In the binary image, pixel values corresponding to one or more events may be "1" or "0". For example, a pixel having a pixel value of "1" may be construed as corresponding to an event related to a light-emitting device flickering at the first frequency. The pose estimation apparatus may discriminate a flicker event related to a light-emitting device flickering at the first frequency from a random noise event, using the polarity of the event. The first frequency may correspond to, for example, the "flicker frequency" described above. In this example, an image frame including all events (flicker events and random noise events) of the event stream may be generated, for example, like an image frame 510 of FIG. 5. In addition, an image frame including flicker events included in the event stream may be generated like an image frame 530 of FIG. 5.

In operation 240, the pose estimation apparatus extracts a feature sequence including feature vectors corresponding to the at least one target pixel from the image frame sequence generated in operation 230. In this example, an image frame included in the image frame sequence may include a very small number of target pixels corresponding to light-emitting devices having a predetermined flicker frequency. For example, only ten or fewer pixels corresponding to the light-emitting devices may be included in the image frame of 640×480 pixels. However, other number of pixels corresponding to the light-emitting devices may be used without departing from the spirit and scope of the illustrative examples described.

To emphasize the image features and reduce the computing complexity of deep learning, a feature vector may be compressed, or the dimension of the feature vector may be reduced through SVD for an image matrix corresponding to the image frame. For example, if an image matrix corresponding to an image frame including a sparse amount of information is transformed into a column feature vector or a row feature vector, a great vector may be obtained. For example, a 43200×1-dimensional feature vector may be obtained with respect to an image frame of 180×240 pixels.

The image frame sequence generated in operation 230 and the feature sequence extracted in operation 240 may correspond to time series data. The pose estimation apparatus may process the time series data using an LSTM-based DNN model, thereby perfectly understanding information included in the time series data and a relationship between adjacent time series data.

In this example, the information included in the time series data may include, for example, information on a continuous trajectory formed by a moving object during movement, and information indicating that adjacent image frames are similar and that poses of a target object represented by adjacent image frames are similar. As described below, in the training process, the input matrix and the output matrix of the DNN model may be formed according to the temporal order of the image frame sequence and/or the feature sequence. In this example, the image frame sequence may match the sequence of the event stream in terms of temporal order.

An example in which the pose estimation apparatus extracts a feature sequence will be described further with reference to FIGS. 6 and 7.

In operation 250, the pose estimation apparatus estimates a pose sequence of the target object by applying the feature sequence extracted in operation 240 to the DNN model. The DNN model includes a regression layer, and the regression layer may estimate 6DoF of the target object corresponding to the estimated pose sequence based on the feature sequence. The DNN model may be, for example, trained in advance by a pose sequence including ground truth pose vectors corresponding to the image frame sequence. An example of the DNN will be described in detail with reference to FIG. 8. In addition, a method of training the DNN will be described in detail with reference to FIG. 9.

The pose estimation apparatus may explicitly or implicitly output the estimated pose sequence of the target object. "Explicitly outputting the pose sequence of the target object" may include, for example, displaying a movement trajectory including the position and pose of the target object according to the pose sequence on the screen of the display panel, and/or outputting the pose sequence of the target object in an audio form. "Implicitly outputting the pose sequence of the target object" may include, for example, adjusting an image displayed on the HUD based on the position, angle, and movement trajectory of the target sequence determined from the pose sequence of the target object, or providing a service corresponding to the pose of the target object.

Figure 3:
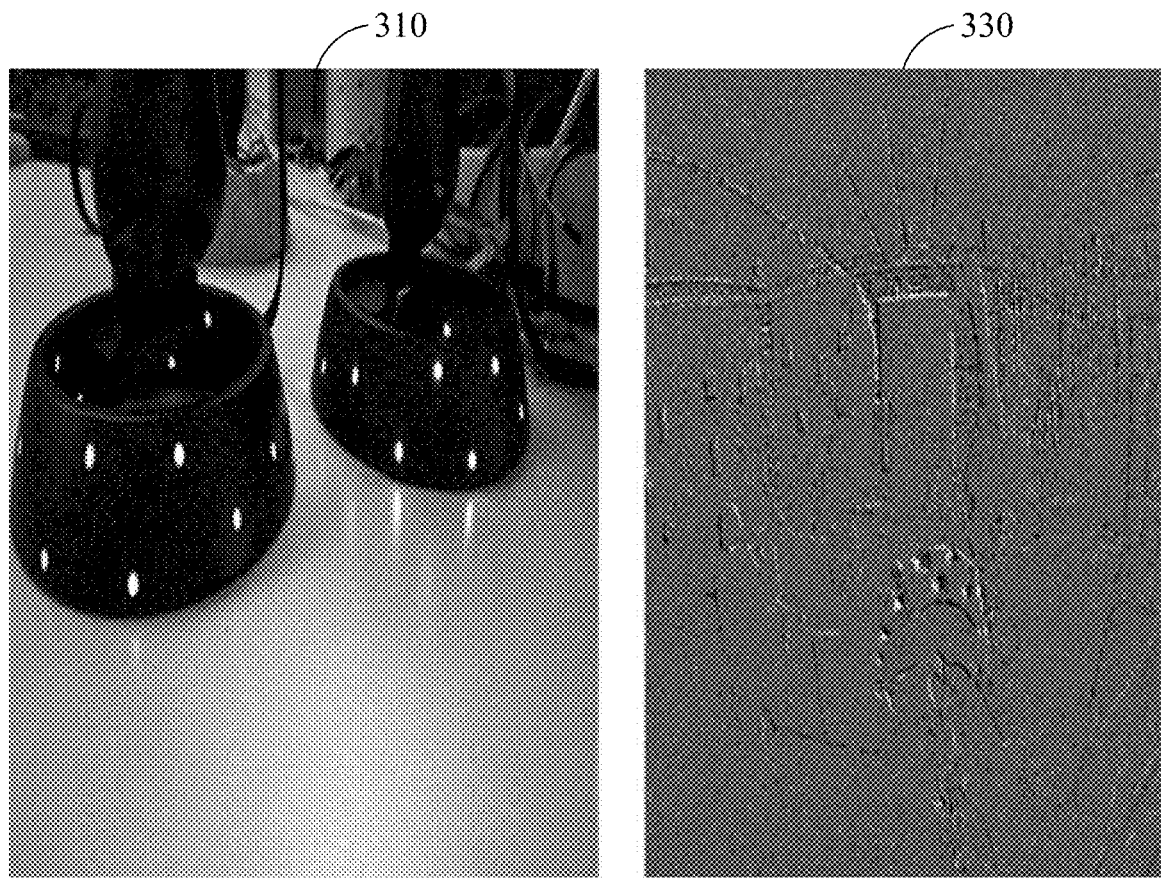
FIG. 3 illustrates examples of a target object to which light-emitting devices are attached and an image frame generated from an event stream corresponding to the target object.

FIG. 3 illustrates examples of a target object to which light-emitting devices are attached and an image frame generated from an event stream corresponding to the target object. Referring to FIG. 3, the image 310 showing a target object to which light-emitting devices flickering at a predetermined first frequency are attached, and an example of the image frame 330 generated from an event stream obtained by the light-emitting devices flickering at the first frequency are illustrated. The target object may be, for example, a hand-held controller.

For more accurate pose estimation, a plurality of light-emitting devices may be distributed on the surface of the target object. In this example, the distribution patterns of the light-emitting devices observed from a plurality of different views may be different. For example, as shown in the image 310, 32 light-emitting devices may be disposed on the target object.

An event-based vision sensor may sense only a change in the brightness or illuminance within its field of view. For example, if there is no change in the illuminance at a position of a pixel, the position is not activated. The event-based vision sensor may output a series of event streams. In this example, an event included in an event stream may indicate a change in the polarity p at a predetermined time t and a predetermined position (x, y) on an image plane. The event may be expressed by, for example, a quaternion vector (t, x, y, p). Here, t corresponds to the timestamp of the event, the predetermined position (x, y) corresponds to the pixel position of the event in the image frame, and p corresponds to the polarity of the event.

The event-based vision sensor may output the event stream including events. For example, when compared to a CMOS camera, the event-based vision sensor has a higher temporal resolution (for example, microseconds) and a higher dynamic range and thus, is more appropriate for application fields requiring visual data of low latency and high dynamic range.

For example, the event-based vision sensor is appropriate for detecting a light-emitting device having a high flicker frequency (for example, 1 kHz or higher). The event-based vision sensor may be, for example, a video graphics array (VGA) device. In addition, the resolution of the event-based vision sensor may be, for example, 640×480 pixels.

The target object may have 6DoF in a 3D space including 3D translations/positions (x, y, z) and 3D rotation angles (for example, the Euler angles in three orthogonal directions). In an example, to avoid the inherent issue (for example, gimbal lock) of the Euler angles, three Euler angles may be replaced with four quaternions with four elements (q0, q1, q2, q3). The pose estimation apparatus may estimate the pose of the target object in the 3D space through, for example, a 7-dimensional vector (x, y, z, q0, q1, q2, q3).

For example, in the image frame 330, a pixel not in gray may represent an event including a timestamp, a predetermined position, and a polarity. In this example, the polarity of the event may be represented in white if the light-emitting device is turned on, and in black if the light-emitting device is turned off.

Figure 4:
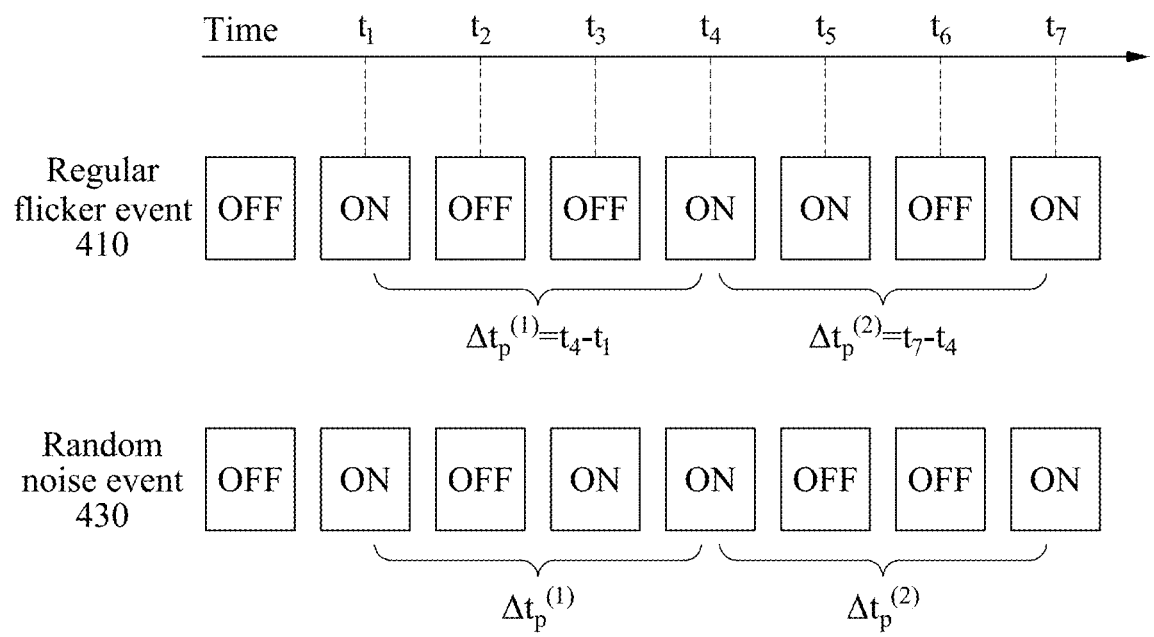
FIG. 4 illustrates an example of a change in the polarity of an event stream.

FIG. 4 illustrates an example of a change in the polarity of an event stream. Referring to FIG. 4, polarity change periods respectively corresponding to a regular flicker event 410 and a random noise event 430 are illustrated.

For example, it may be assumed that in an image frame, a movement in a very short time interval (for example, 1.5 microseconds) is negligible.

In this example, if changes in the polarity of continuous events reach one cycle, for example, "increase→decrease→increase", "On→Off→On", or "Off→On→Off", the corresponding period may be regarded as the change period $\Delta t_p$ at the given pixel position (x, y). In this example, the distribution $\Delta t_p$ of the change period $p(\Delta t_p|f)$ may be approximated as a Gaussian distribution. Here, f may be a preset flicker frequency. For example, if the probability $\Delta t_p$ (where σ=30 Hz) of the change period $$p(\Delta t_p \mid f) = N\left(\frac{1}{\Delta t_p} - f, \ \sigma^2\right)$$

is greater than a preset threshold, the corresponding event may be considered as being generated by flickering of a light-emitting device having the flicker frequency.

In addition, the pose estimation apparatus may obtain an image frame sequence from an event stream including a plurality of events by discriminating a flicker event from a random noise event using various methods.

For example, it may be assumed that a polarity change period at the position of a given pixel is observed multiple times. If all the lengths of the change periods are approximately equal or a deviation thereof is sufficiently diminutive, the pose estimation apparatus may use an average value $\overline{\Delta t_p}$ of the lengths of the change periods as a final change period of the pixel position (x, y). In addition, the pose estimation apparatus may consider an event corresponding to the pixel position (x, y) as a random noise event, if a difference between lengths of change periods is greater than a predetermined length. The pose estimation apparatus may consider an event corresponding to the pixel position (x, y) as a flicker event, if the difference between the lengths of the change periods is less than or equal to the predetermined length.

In another example, the pose estimation apparatus may calculate a frequency $f_p=1/\Delta t_p$ corresponding to the pixel position (x, y) based on the change period $\Delta t_p$ at the pixel position (x, y). The pose estimation apparatus may determine a pixel to be a target pixel corresponding to the position of a light-emitting device, if a difference between a frequency calculated for the pixel and the preset flicker frequency $f_{LED}$ is within a predetermined threshold range. The pose estimation apparatus may generate an image frame using the target pixel.

The pose estimation apparatus may generate an image frame sequence from an event stream including events, through the process described above.

Figure 5:
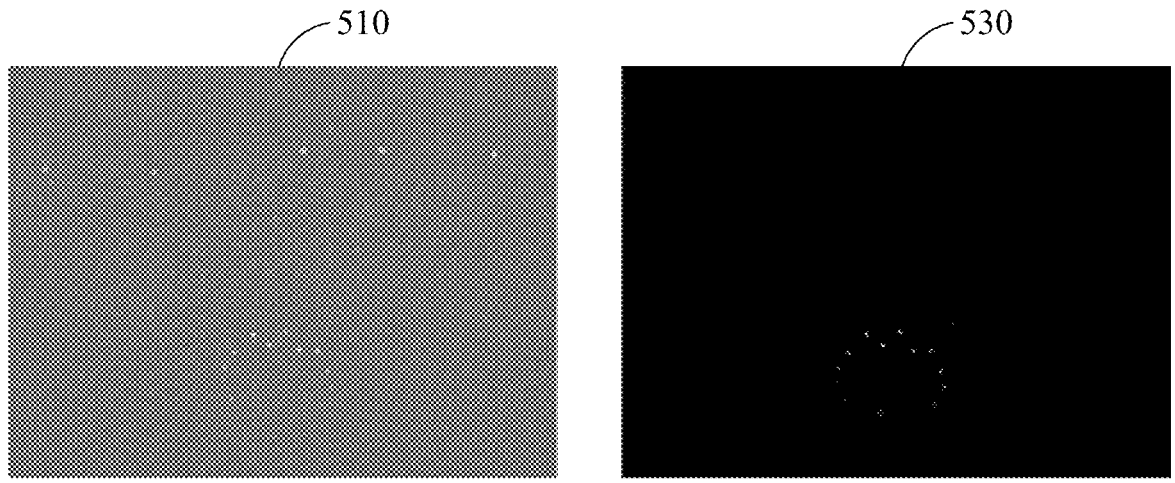
FIG. 5 illustrates examples of an image frame including all events and an image frame including a flicker event.

FIG. 5 illustrates examples of an image frame including all events and an image frame including a flicker event. Referring to FIG. 5, an image frame 510 including all flicker events and random noise included in an event stream and an image frame 530 including only the flicker events included in the event stream are illustrated.

In the image frame 530, regions corresponding to the light-emitting devices where the flicker events occur may be represented in white, and the remaining background regions, except for the regions corresponding to the light-emitting devices, may be represented in black. The pose estimation apparatus may sense only the regions corresponding to the light-emitting devices, for example, by removing the background region set in black from the image frame. The pose estimation apparatus may use the regions in which events by the light-emitting devices are sensed, as an ideal input for pose estimation.

Figure 6:
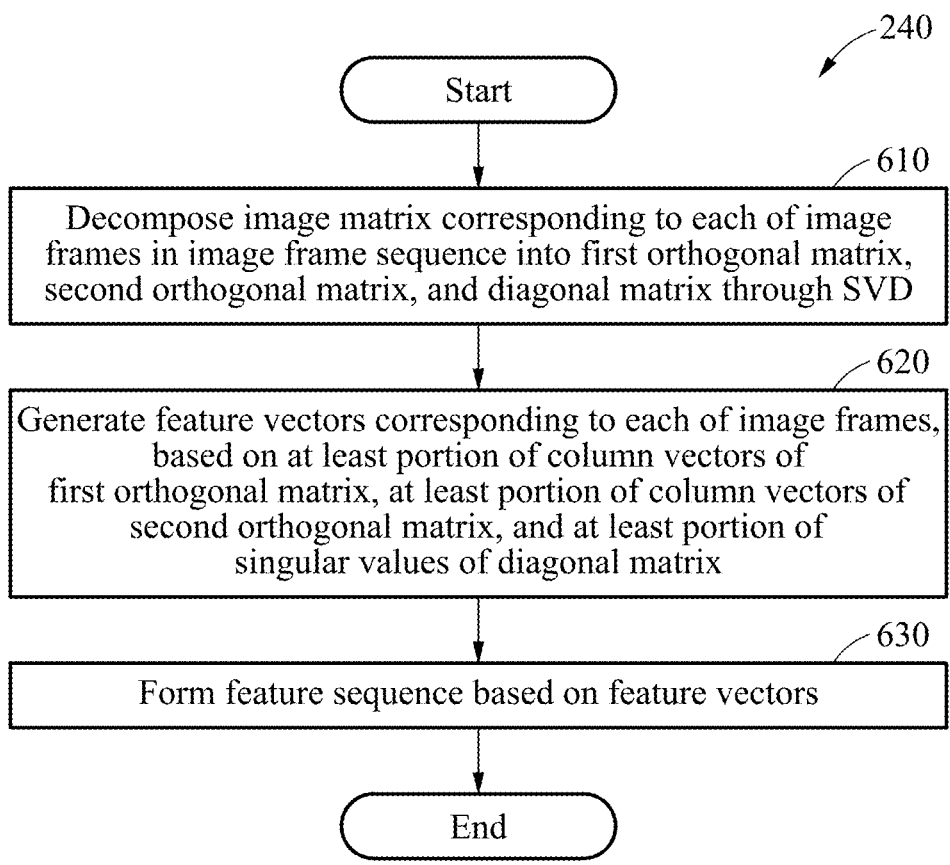
FIG. 6 illustrates an example of extracting a feature sequence.

FIG. 6 illustrates an example of extracting a feature sequence. Referring to FIG. 6, a pose estimation apparatus may construct and extract a feature sequence from an image frame sequence through a process including operations 610 to 630.

In operation 610, the pose estimation apparatus may decompose an image matrix corresponding to each of image frames in the image frame sequence into a first orthogonal matrix, a second orthogonal matrix, and a diagonal matrix through SVD.

For example, since most of the pixels in the image frame are represented as background regions in black due to the scarcity of information included in the image frame, the pose estimation apparatus may perform compression or dimension reduction with respect to the image frame. The pose estimation apparatus may compress the image frame sequence or reduce the dimension thereof, for example, through SVD with respect to the image matrix corresponding to each of the image frames.

For example, SVD may be performed with respect to an m×n image matrix X for an image frame included in the image frame sequence, as expressed by Equation 1.

$$X=USV^T \qquad \text{[Equation 1]}$$

Here, U denotes an m×m first orthogonal matrix, V denotes an n×n second orthogonal matrix, and S denotes an m×n diagonal matrix. Each element of the m×n image matrix X may indicate a pixel value (for example, a gray value).

The pose estimation apparatus may maintain N singular values according to the descending order of singular values in the diagonal matrix S. N may be a natural number such as 1, 5, 15, or 25, for example. An example of an image frame reconstructed based on the number of singular values obtained according to the result of SVD on the image frame is shown in FIG. 7.

The pose estimation apparatus may maintain N column vectors according to the descending order of the first orthogonal matrix U and N column vectors according to the descending order of the second orthogonal matrix V. In this example, most of the image information may be included in the N singular values and singular vectors corresponding to the N singular values.

The pose estimation apparatus may obtain a long vector, for example, in the size of (m+m+1)×n, based on the N column vectors maintained in the first orthogonal matrix U and the second orthogonal matrix V and the N singular values maintained in the diagonal matrix S. In this example, the long vector in the size of (m+m+1)×n may correspond to a very small value when compared to the m×n image matrix X.

The pose estimation apparatus may reduce the dimensions of feature vectors by generating the feature vectors through selecting a portion of vectors based on SVD results. In addition, the pose estimation apparatus may effectively reflect image features through a portion of the vectors, rather than all the vectors. In addition, by training the DNN model using the feature vector(s) generated by a portion of the vectors, the execution efficiency of the training process may be improved.

In operation 620, the pose estimation apparatus may generate feature vectors corresponding to each of the image frames, based on at least a portion of column vectors of the first orthogonal matrix, at least a portion of column vectors of the second orthogonal matrix, and at least a portion of singular values of the diagonal matrix. In this example, at least a portion of the singular values of the diagonal matrix may include sequential N singular values in descending order of the singular values of the diagonal matrix (N being a natural number). Preferably, N may be a natural number of 25 or greater. At least a portion of the column vectors of the first orthogonal matrix may include, for example, N column vectors of the first orthogonal matrix corresponding to the N singular values. Further, at least a portion of the column vectors of the second orthogonal matrix may include, for example, N column vectors of the second orthogonal matrix corresponding to the N singular values. The pose estimation apparatus may maintain, for example, a right singular vector and a left singular vector which correspond to the greatest singular values among the SVD results.

After the execution in descending order of the singular values, the pose estimation apparatus may not only effectively represent the features of the target object by the feature vectors generated based on the first N singular values and column vectors corresponding to the N singular values, but also improve the calculation efficiency by reducing the dimension of the vectors.

In operation 630, the pose estimation apparatus may form a feature sequence based on the feature vectors generated in operation 620. The pose estimation apparatus may extract the formed feature sequence.

Figure 7:
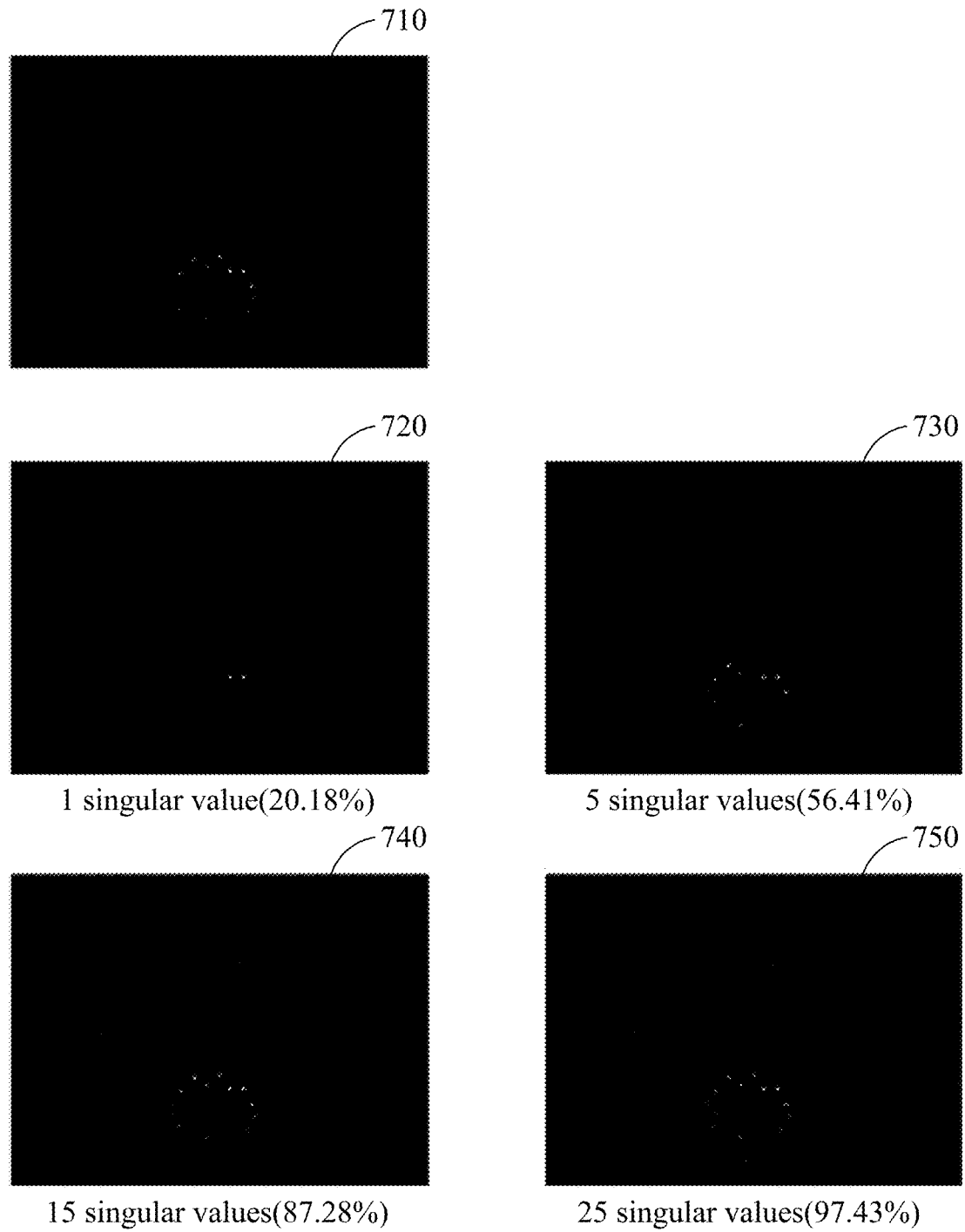
FIG. 7 illustrates examples of image frames before and after singular value decomposition (SVD).

FIG. 7 illustrates examples of image frames before and after SVD. Referring to FIG. 7, an image frame 710 of an image frame sequence generated from an event stream, and image frames 720, 730, 740, and 750 respectively reconstructed by 1, 5, 15, and 25 singular values according to results of SVD on the image frame 710 are illustrated.

For example, the image frame 720 may be reconstructed by 1 singular value maintained according to SVD on the image frame 710, and the image frame 730 may be reconstructed by 5 singular values. Further, the image frame 740 may be reconstructed by 15 singular values maintained according to SVD on the image frame 710, and the image frame 750 may be reconstructed by 25 singular values. In this example, a percentage of reconstructed energy generated by reconstruction in total energy may be displayed in each of the reconstructed image frames 720, 730, 740, and 750.

For example, if the pose estimation apparatus maintains 25 (for example, 5.2%) or more (for example, more than 5.2%) singular values, among 480 singular values obtained through SVD, it is sufficient to effectively reconstruct an image frame.

The pose estimation apparatus may obtain a feature sequence by using vectors obtained through SVD described above (for example, column vectors with a length of (m+n+1)×n) as feature vectors.

Figure 8:
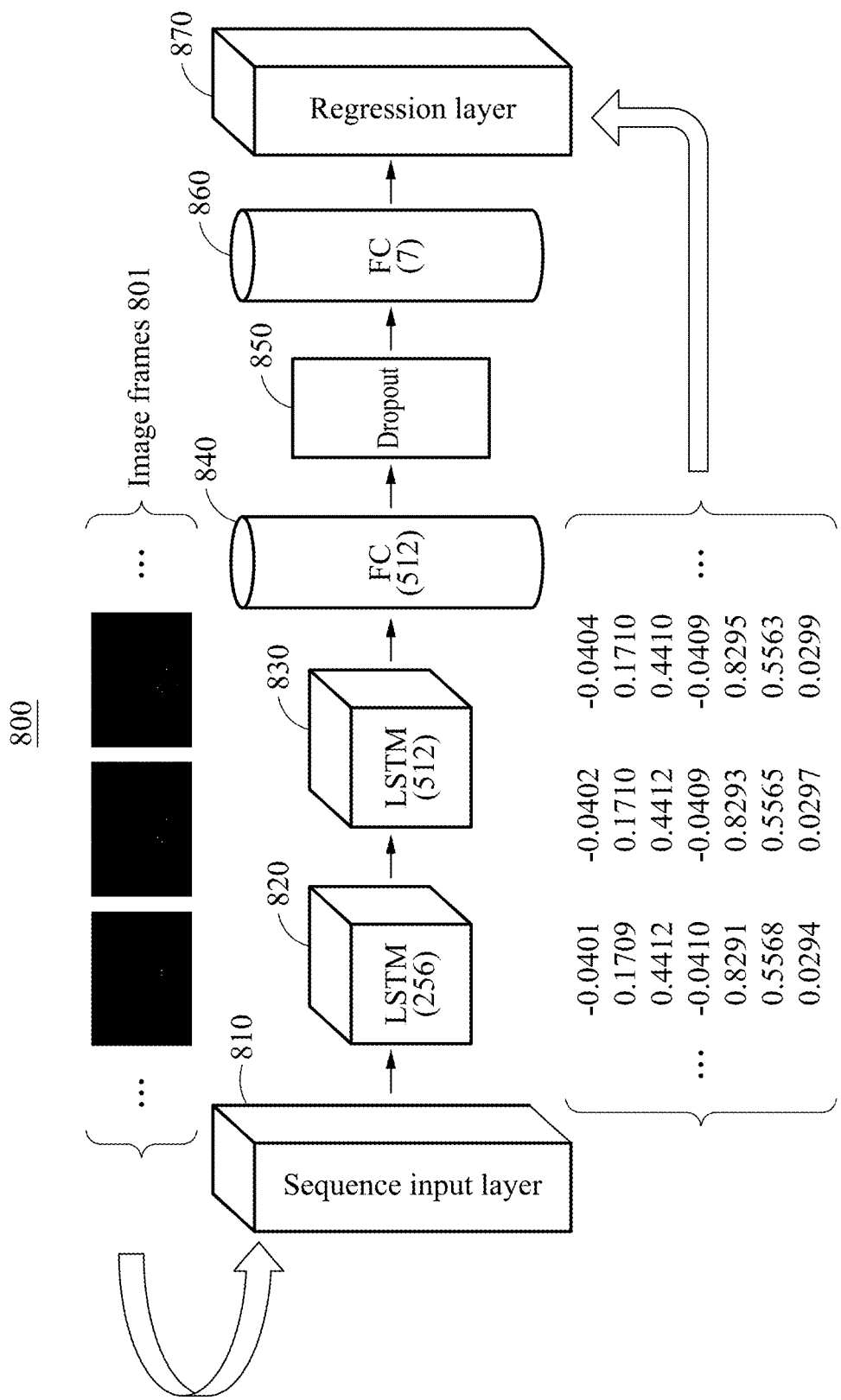
FIG. 8 illustrates an example of a structure of a deep neural network (DNN) model for estimating a pose sequence of a target object.

FIG. 8 illustrates an example of a structure of a deep neural network model for estimating a pose sequence of a target object. Referring to FIG. 8, a structure of an LSTM-based DNN model 800 for regression analysis between sequences is illustrated.

The DNN model 800 may include a sequence input layer (810), a first LSTM layer 820, a second LSTM layer 830, and a first full connected (FC) layer 840, a dropout layer 850, a second FC layer 860, and a regression layer 870.

If a feature sequence obtained based on image frames 801 extracted from an event stream is inputted into the sequence input layer 810, the DNN model 800 may perform deep learning for pose estimation based on the feature sequence. The DNN model 800 may form an input matrix and an output matrix and perform training through each layer.

The DNN model 800 may obtain a pose vector estimated from a feature vector corresponding to a target object to be estimated. The DNN model 800 may be optimized using, for example, an adaptive moment. For example, a slope threshold (weight attenuation) of the DNN model 800 may be set to "1", and a minimum batch size thereof may be "64". The DNN model 800 may be trained, for example, by a sequence-to-sequence learning process.

The DNN model 800 may generate an input matrix and an output matrix for training based on a feature sequence corresponding to the image frames 801 inputted into the sequence input layer 810 and a pose sequence including ground truth pose vectors 803.

The input matrix may be formed by combining feature vectors included in the feature sequence according to a time sequence of the event stream. Further, the output matrix may be formed by combining pose vectors included in the pose sequence according to the time sequence of the event stream.

More specifically, the DNN model 800 may extract feature vectors respectively from the image frames 801 and obtain the input matrix by overlapping the extracted feature vectors in the unit of columns. In addition, the DNN model 800 may obtain the output matrix and a ground truth label matrix by overlapping ground truth pose vectors respectively corresponding to the image frames 801 in the unit of columns. The DNN model 800 may extract feature vectors from a given image frame using various methods other than that described above.

The first LSTM layer 820 may include, for example, 256 units.

The second LSTM layer 830 may include, for example, 512 units.

The DNN model 800 may include the plurality of LSTM layers 820 and 830 stacked to process time series data. Instead of processing each image frame individually, it is possible to investigate "time series" image information. A sequence input may be formed by combining feature vectors of adjacent image frames. In this example, the feature vectors of each image frame may be obtained from columns of the input matrix. In addition, ground truth pose vectors respectively corresponding to the image frames 801 may be combined with a sequence output of the DNN model 800. In this example, the ground truth pose vectors may be columns of the output matrix.

An actual temporal sequence may be considered by grouping adjacent image frames together to form the ground truth pose vectors 803 corresponding to sequential inputs as sequential outputs.

The first FC layer 840 may include, for example, 512 units.

The dropout layer 850 may be based on a regularization technique to prevent the DNN model 800 from overfitting training data. The DNN model 800 may drop out some nodes at random during a training process through the dropout layer 850.

The second FC layer 860 may include 7 units. The second FC layer 860 may include, for example, a layer fully connected with 7 output units to obtain a 7-dimensional pose vector. In this example, the 7 output units may correspond to the 7-dimensional vector (x, y, z, q0, q1, q2, q3) including the 3D coordinates and 4 quaternions described above.

The regression layer 870 may finally output the estimated pose vector. During training, the ground truth pose vectors 803 may be inputted into the regression layer 870 in the form of a matrix, and the matrix formed by ground truth pose vectors 803 may be used as the output matrix.

Figure 9:
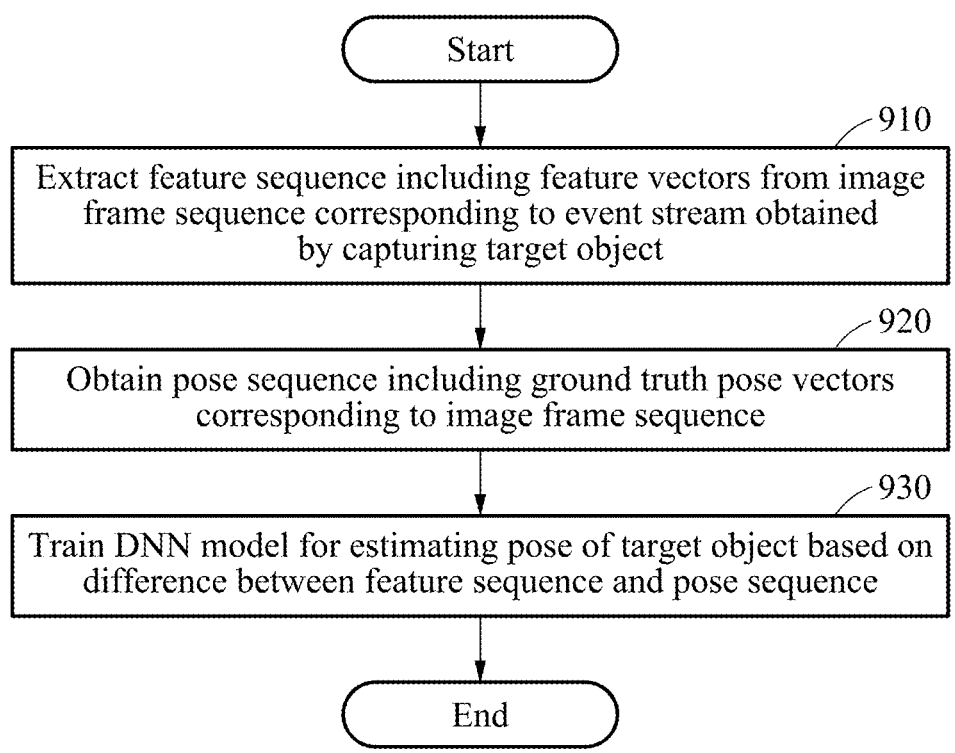
FIG. 9 illustrates an example of a training method for pose estimation.

FIG. 9 illustrates an example of a training method for pose estimation. Referring to FIG. 9, a training apparatus may train a DNN model for estimating a pose of a target object through operations 910 to 930.

In operation 910, the training apparatus extracts a feature sequence including feature vectors from an image frame sequence corresponding to an event stream obtained by capturing a target object.

In operation 920, the training device obtains a pose sequence including ground truth pose vectors corresponding to the image frame sequence.

In operation 930, the training apparatus trains a DNN model for estimating a pose of the target object based on a difference between the feature sequence extracted in operation 910 and the pose sequence obtained in operation 920. An example of the structure of the DNN model is shown in FIG. 8. In detail, in operation 930, the training apparatus may calculate parameters of the DNN model to minimize differences between the feature vectors included in the feature sequence and the ground truth pose vectors included in the pose sequence, and train the DNN model using the calculated parameters.

Figure 10:
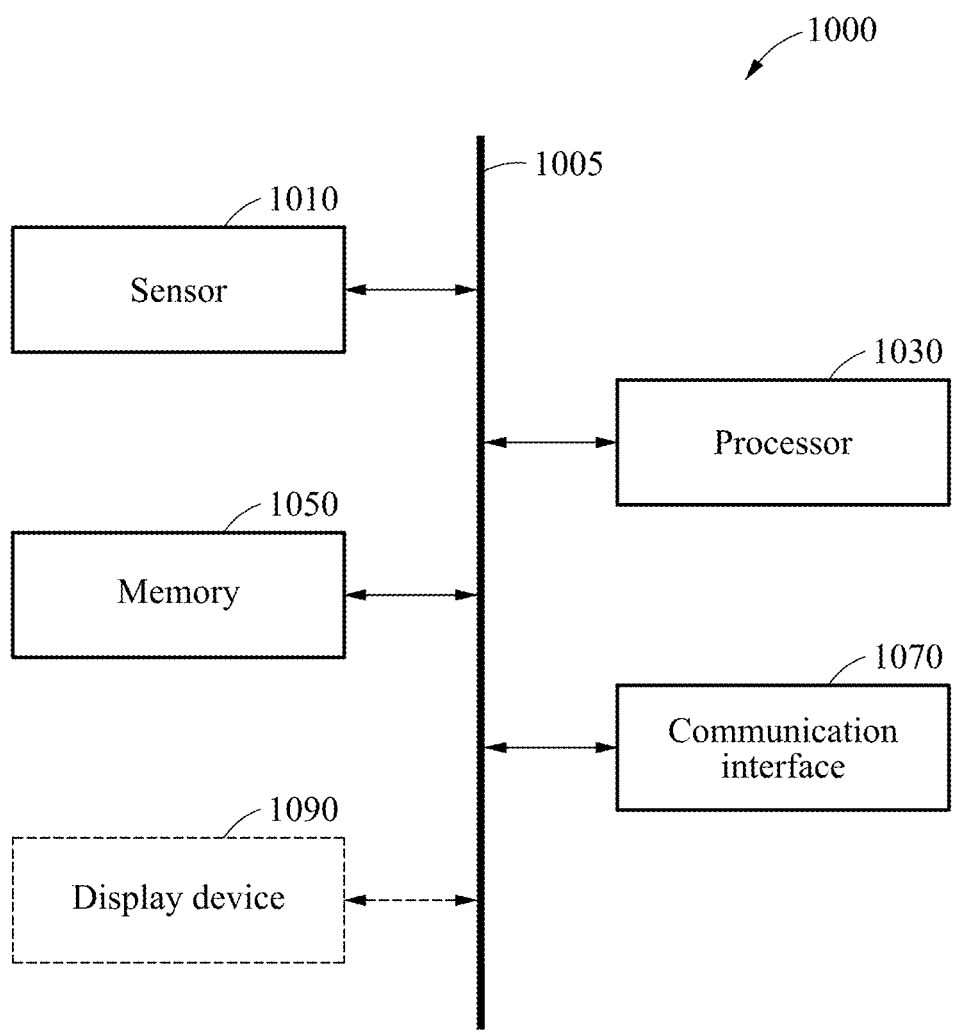
FIG. 10 illustrates an example of a pose estimation apparatus.

FIG. 10 illustrates an example of a pose estimation apparatus. Referring to FIG. 10, a pose estimation apparatus 1000 includes a sensor 1010 and a processor 1030. The pose estimation apparatus 1000 may further include a memory 1050, a communication interface 1070, and a display device 1090. The sensor 1010, the processor 1030, the memory 1050, the communication interface 1070, and the display device 1090 may communicate with each other through a communication bus 1005.

The sensor 1010 captures an event stream of a target object to which light-emitting devices flickering at a predetermined first frequency are attached. The sensor 1010 may be, for example, a dynamic vision sensor (DVS) camera or an event-based vision sensor.

The processor 1030 obtains a polarity change period of at least one pixel based on the event stream captured by the sensor 1010. The processor 1030 generates an image frame sequence using at least one target pixel having a polarity change period corresponding to the first frequency, among the at least one pixel. The processor 1030 extracts a feature sequence including feature vectors corresponding to the at least one target pixel from the image frame sequence. The processor 1030 estimates a pose sequence of the target object by applying the feature sequence to a deep neural network model.

The processor 1030 may be one processor or a plurality of processors. The processor 1030 may perform the at least one method described with reference to FIGS. 1 through 9 or an algorithm corresponding to the at least one method. The processor 1030 may execute a program and control the pose estimation apparatus 1000. Program codes to be executed by the processor 1030 may be stored in the memory 1050. The processor 1030 may include, for example, a central processing unit (CPU), a graphics processing unit (GPU), and a neural processing unit (NPU).

The memory 1050 may store the event stream obtained from the event-based vision sensor 1010, the polarity change period of the pixel obtained by the processor 1030, the image frame sequence generated by the processor 1030, and the feature sequence extracted by the processor 1030. Further, the memory 1050 may store the pose sequence of the target object estimated by the processor 1030 and/or information on the pose of the target object. The memory 1050 may be a volatile memory or a non-volatile memory.

The communication interface 1070 may receive an image frame and/or an event stream from the outside of the pose estimation apparatus 1000. The communication interface 1070 may output the image frame sequence, the feature sequence, the pose sequence of the target object, and/or the information on the pose of the target object generated by the processor 1030. The communication interface 1070 may receive an image frame captured from the outside of the pose estimation apparatus 1000 or information on various sensors received from the outside of the pose estimation apparatus 1000.

The display device 1090 may display, for example, the pose sequence of the target object estimated by the processor 1030. For example, when the pose estimation apparatus 1000 is embedded in a vehicle, the display device 1090 may be configured as a head-up display (HUD) installed in the vehicle. The display device 1090 may be optionally used.

The pose estimation apparatus 1000 may include, for example, a head-up display (HUD) device, a 3D digital information display (DID), a navigation system, a 3D mobile device, a smart phone, a smart TV, and a smart vehicle, but is not limited thereto. The 3D mobile device may be construed as including all display devices such as, for example, a display device for displaying augmented reality (AR), virtual reality (VR), and/or mixed reality (MR), a head-mounted display (HMD), and a face-mounted display (FMD).

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described examples, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A pose estimation method, comprising:
   obtaining an event stream, captured by an event-based vision sensor, light-emitting devices, of a target object, flickering at a first frequency;
   obtaining a polarity change period of at least one pixel based on the event stream;
   determining, from among the at least one pixel, at least one target pixel to which the polarity change period of the at least one pixel has a periodicity in relation to the first frequency;
   generating, from among the at least one pixel, an image frame sequence using the at least one target pixel;
   extracting, from the generated image frame sequence, a feature sequence including feature vectors corresponding to the at least one target pixel; and
   estimating a pose sequence of the target object using a pose sequence estimation deep neural network (DNN) model provided the extracted feature sequence.

2. The pose estimation method of claim 1, wherein the event stream comprises any one or any combination of:
   a timestamp indicating a time at which an event corresponding to the flickering is captured;
   position coordinates of a pixel corresponding to the event; and
   a polarity corresponding to the event.

3. The pose estimation method of claim 1, wherein the event stream comprises at least one of:
   a first event that occurs in synchronization with the first frequency; or a second event that occurs without synchronization with the first frequency.

4. The pose estimation method of claim 4claim 1, wherein the determining of the at least one target pixel comprises determining the at least one target pixel,. to be a pixel at a position among respective positions of the at least one pixel, based on a difference between the first frequency and a second frequency corresponding to the polarity change period, at the pixel at the position, being within a threshold range.

5. The pose estimation method of claim 1, wherein the determining of the at least one target pixel comprises determining the at least one target pixel, to be a pixel at a position among respective positions of the at least one pixel, based on a deviation between lengths of polarity change periods consecutively sensed from the pixel at the position.

6. The pose estimation method of claim 5, wherein the determining of the at least one target pixel comprises:
   determining the pixel at the position to be the at least one target pixel, in response to the deviation being less than a threshold; and
   determining the pixel at the position to be a background pixel, in response to the deviation being greater than or equal to the threshold.

7. The pose estimation method of claim 1, wherein the generating of the image frame sequence comprises generating the image frame sequence by synthesizing an image frame including the at least one target pixel.

8. The pose estimation method of claim 1, wherein the extracting of the feature sequence comprises:
   decomposing an image matrix corresponding to each of image frames in the image frame sequence into a first orthogonal matrix, a second orthogonal matrix, and a diagonal matrix through singular value decomposition (SVD);
   generating the feature vectors corresponding to each of the image frames, based on at least a portion of column vectors of the first orthogonal matrix, at least a portion of column vectors of the second orthogonal matrix, and at least a portion of singular values of the diagonal matrix; and
   forming the feature sequence based on the feature vectors.

9. The pose estimation method of claim 8, wherein:
   the at least the portion of the singular values of the diagonal matrix comprises sequential N singular values in descending order of the singular values of the diagonal matrix, N being a natural number,
   the at least the portion of the column vectors of the first orthogonal matrix comprises N column vectors of the first orthogonal matrix corresponding to the N singular values, and
   the at least the portion of the column vectors of the second orthogonal matrix comprises N column vectors of the second orthogonal matrix corresponding to the N singular values.

10. The pose estimation method of claim 1, wherein the pose sequence estimation DNN model comprises a regression layer configured to estimate 6 degrees of freedom (6-DoF) of the target object corresponding to the pose sequence estimated based on the feature sequence.

11. A non-transitory computer-readable storage medium storing instructions that, when executed by a processor, cause the processor to perform the pose estimation method of claim 1.

12. A pose estimation apparatus, comprising:
a sensor configured to capture an event stream of a target object to which light-emitting devices, of a target object, flickering at a first frequency are attached; and
a processor configured to:
obtain a polarity change period of at least one pixel based on the event stream;
determine, from among the at least one pixel, at least one target pixel to which the polarity change period of the at least one pixel has a periodicity in relation to the first frequency;
generate an image frame sequence using the at least one target pixel;
extract, from the generated image frame sequence, a feature sequence including feature vectors corresponding to the at least one target pixel; and
estimate a pose sequence of the target object using a pose sequence estimation deep neural network (DNN) model provided the extracted feature sequence.

13. The pose estimation apparatus of claim 12, wherein the event stream comprises at least one of:
a timestamp indicating a time at which an event corresponding to the flickering is captured;
position coordinates of a pixel corresponding to the event; and
a polarity corresponding to the event.

14. The pose estimation apparatus of claim 12, wherein the processor is further configured to determine the at least one target pixel, to be a pixel at a position among respective positions of the at least one pixel, based on a difference between the first frequency and a second frequency corresponding to the polarity change period, at the pixel at the position, being within a threshold range.

15. The pose estimation apparatus of claim 12, wherein the processor is further configured to determine the at least one target pixel, to be a pixel at a position among respective positions of the at least one pixel, based on a deviation between lengths of polarity change periods consecutively sensed from the pixel at the position.

16. A pose estimation apparatus, comprising:
a sensor configured to capture an event stream of a target object to which light-emitting devices flickering at a first frequency are attached; and
a processor configured to
obtain a polarity change period of at least one pixel based on the event stream,
generate an image frame sequence using at least one target pixel having a polarity change period corresponding to the first frequency, from among the at least one pixel,
extract a feature sequence including feature vectors corresponding to the at least one target pixel, from the image frame sequence, and
estimate a pose sequence of the target object by applying the feature sequence to a deep neural network (DNN) model,
wherein the processor is further configured to
decompose an image matrix corresponding to each of image frames in the image frame sequence into a first orthogonal matrix, a second orthogonal matrix, and a diagonal matrix through singular value decomposition (SVD),
generate the feature vectors corresponding to each of the image frames, based on at least a portion of column vectors of the first orthogonal matrix, at least a portion of column vectors of the second orthogonal matrix, and at least a portion of singular values of the diagonal matrix, and
form the feature sequence based on the feature vectors.

17. The pose estimation apparatus of claim 16, wherein:
the at least the portion of the singular values of the diagonal matrix comprises sequential N singular values in descending order of the singular values of the diagonal matrix, N being a natural number,
the at least the portion of the column vectors of the first orthogonal matrix comprises N column vectors of the first orthogonal matrix corresponding to the N singular values, and
the at least the portion of the column vectors of the second orthogonal matrix comprises N column vectors of the second orthogonal matrix corresponding to the N singular values.

18. The pose estimation apparatus of claim 12, wherein the pose estimation apparatus comprises any one or any combination of a head-up display (HUD) device, a three-dimensional digital information display (3D DID), a 3D mobile device, a virtual reality handle controller, and a smart vehicle.

19. The pose estimation apparatus of claim 12, wherein the processor is further configured to
decompose an image matrix corresponding to each of image frames in the image frame sequence into a first orthogonal matrix, a second orthogonal matrix, and a diagonal matrix through singular value decomposition (SVD),
generate the feature vectors corresponding to each of the image frames, based on at least a portion of column vectors of the first orthogonal matrix, at least a portion of column vectors of the second orthogonal matrix, and at least a portion of singular values of the diagonal matrix, and
form the feature sequence based on the feature vectors.

20. The pose estimation apparatus of claim 19, wherein:
the at least the portion of the singular values of the diagonal matrix comprises sequential N singular values in descending order of the singular values of the diagonal matrix, N being a natural number,
the at least the portion of the column vectors of the first orthogonal matrix comprises N column vectors of the first orthogonal matrix corresponding to the N singular values, and
the at least the portion of the column vectors of the second orthogonal matrix comprises N column vectors of the second orthogonal matrix corresponding to the N singular values.

* * * * *